United States Patent [19]

Quaas et al.

[11] Patent Number: 5,120,606
[45] Date of Patent: Jun. 9, 1992

[54] COATINGS BASED ON POLYARYLENE SULFIDES

[75] Inventors: Gerwolf Quaas, Cologne; Erhard Tresper; Klaus Kraft, both of Krefeld; Klaus Reinking, Wermelskirchen, all of Fed. Rep. of Germany

[73] Assignee: Bayer Aktiengesellschaft, Leverkusen, Fed. Rep. of Germany

[21] Appl. No.: 319,055

[22] Filed: Mar. 6, 1989

[30] Foreign Application Priority Data

Mar. 16, 1988 [DE] Fed. Rep. of Germany ....... 3808738

[51] Int. Cl.$^5$ .............................................. C08G 75/14
[52] U.S. Cl. ..................................... 428/419; 528/388
[58] Field of Search ................................. 528/388, 419

[56] References Cited

U.S. PATENT DOCUMENTS

| 3,869,434 | 3/1975 | Hughes et al. | 528/388 |
| 4,274,993 | 6/1981 | Narisawa et al. | 528/388 |
| 4,286,018 | 8/1981 | Asakura et al. | 528/388 |
| 4,598,144 | 7/1986 | Ostlinning | 528/388 |
| 4,631,336 | 12/1986 | Idel et al. | 528/388 |
| 4,645,825 | 2/1987 | Idel | 528/388 |
| 4,661,584 | 4/1987 | Idel et al. | 528/388 |
| 4,663,430 | 5/1987 | Trandov | 528/388 |
| 4,665,156 | 5/1987 | Reinking et al. | 528/388 |
| 4,678,831 | 7/1987 | Kawabata et al. | 524/496 |
| 4,732,967 | 3/1988 | Idel et al. | 528/388 |
| 4,816,335 | 3/1989 | Kouyama et al. | 528/388 |
| 4,839,411 | 6/1989 | Hoover et al. | 524/424 |

FOREIGN PATENT DOCUMENTS 0067676 6/1982 European Pat. Off.

Primary Examiner—Harold D. Anderson
Assistant Examiner—T. Mosley
Attorney, Agent, or Firm—Connolly and Hutz

[57] ABSTRACT

The invention relates to coatings based on linear, high molecular weight polyarylene sulfides, preferably PPS, by extrusion coating of, for example, elongate stock in the form of, for example, wires, strands, optical fibers, etc.

6 Claims, No Drawings

COATINGS BASED ON POLYARYLENE SULFIDES

This invention relates to coatings produced using linear, high molecular weight polyarylene sulfides, preferably PPS, by extrusion coating of, for example, elongate stock in the form of, for example, wires, stranded wires, optical fibers, etc.

The production of such coatings is known from DE-PS 2 453 485. However, these coatings are attended by the disadvantage that the polyphenylene sulfides used are readily soluble in tetrahydrofuran and methylene chloride.

In addition, it is known for example from EP 67 676 that coatings of elongate stock can be produced by wrapping with film tape. However, this form of coating is complicated and expensive because the tapes have to be produced in a first process step and wrapped around the stock to be coated in a second, separate process step. The production rate of the film wrapping process is very low and generally amounts to no more than 100 m/minute.

It has been found that coatings can be applied to substrates by extrusion using linear polyarylene sulfide, preferably PPS.

Accordingly, the present invention relates to coatings of polyarylene sulfides, characterized in that a polyarylene sulfide having a melt viscosity $\eta_m$ of 20 to 1000 Pa.s (at 300° C. and $10^3 sec^{-1}$) and a weight average relative molecular weight $M_w$ (rel) of 25,000 to 500,000 is used, of which the melt viscosity $\eta_m$ and the weight average relative molecular weight $M_w$ bear the following relation to one another:

$$\lg \eta_m = 3.48 \times \lg M_w(\text{rel}) - 14.25 \pm 0.1,$$

preferably $$\lg \eta_m = 3.48 \times \lg M_w(\text{rel}) - 14.25 \pm 0.05.$$

The particular advantage of the polyarylene sulfides suitable for use in accordance with the invention is that they enable smooth insulating coatings substantially free from imperfections to be produced at high take-off speeds.

The mechanical properties of the coatings, their crystallinity and their heat resistance can be increased by heat setting carried out during or after the production process. These properties are of crucial importance to the use of the material in, for example, cables and lines exposed to high temperatures, in insulated wires for heating systems, etc.

In the production of the coatings in accordance with the invention, extrusion is carried out at melt temperatures above the melting point $M_p$ of the polyarylene sulfide (for example above 300° C. in the case of polyphenylene sulfide). After cooling of the melt following its application to the substrate to temperatures below the glass transition temperature $T_G$ of the polyarylene sulfide, the coating is heatset between $T_G$ and $M_p$. Alternatively, cooling may be carried out slowly in order in this way to achieve the good mechanical properties and the heat resistance of the coatings.

Polyarylene sulfides suitable for use in accordance with the invention are known, for example, from EP-OS 171 021 and are commercially available (for example Tedu ®, a product of BAYER AG). They are substantially insoluble in tetrahydrofuran and chlorinated hydrocarbons (for example $CH_2Cl_2$, $CHCl_3$).

According to the invention, the polyarylene sulfides, preferably polyphenylene sulfide, are applied to the substrate (for example wires, sheets, fibers, films, etc.) by extrusion.

The substrates may consist of any of various materials, including for example metals, glass, organic and inorganic plastics, wood, natural fibers, stone, etc.

In one particular embodiment, moldings coated with polyarylene sulfides can be produced by the co-extrusion of polyarylene sulfides with other extrudable materials.

In addition, small quantities of other suitable polymers, for example elastomers, and/or up to 30% fillers in the form of powders or fibers may be added to improve the mechanical properties, such as for example ultimate tensile strength and elongation at break.

EXAMPLE 1

A polyarylene sulfide (for example according to EP-OS 171 021) having a viscosity of 200 Pa.s (as measured at 306° C. and $10^3 sec^{-1}$) was processed on a standard extrusion line to form insulating coatings around copper conductors 0.6 mm in diameter.

Extruder=80 mm in diameter.
L/D ratio=24:1.
Nozzle diameter=1.5 mm.
Layer thickness of the insulation=0.4 mm.
Take-off speed=250 m/minute.
Melt temperature =340° C.
Properties of the insulation

|  | Untreated | After heat-setting at 200° C. |
|---|---|---|
| Ultimate tensile strength | 42.4 N/mm² | 76.3 N/mm² |
| Elongation | 172% | 6.2% |

The insulations had a smooth, gloss surface.

EXAMPLE 2

The polyarylene sulfide mentioned above was processed on the same extrusion line to form 0.16 mm thick insulating coatings around copper wires.

Nozzle diameter=1.0 mm.
Take-off speed=1300 m/minute.
Properties of the insulation

|  | Untreated | After heat-setting at 200° C. |
|---|---|---|
| Ultimate tensile strength | 49 N/mm² | 84.7 N/mm² |
| Elongation at break | 10.4% | 3.6% |
| Surface |  | smooth, glossy |

We claim:

1. An article of manufacture which comprises a substrate coated with a polyarylene sulfide having a melt viscosity $n_m$ of 20 to 1,000 Pa.s and a weight average molecular weight $M_w$ (rel) of 25,000 to 500,000 wherein the melt viscosity $n_m$ and the weight average relative molecular weight $M_w$ bear the following relationship to one another:

$$\lg n_m = 3.48 \times \lg M_w(\text{rel}) - 14.25 \pm 0.1$$

2. An article as claimed in claim 1 wherein $n_m$ and $M_w(rel)$ have the following relation:

$$lg\, n_m = 3.48 \times lgM_w(rel) - 14.25 \pm 0.05.$$

3. An article as claimed in claim 1 wherein the coating of polyarylene sulfide is produced by extrusion.

4. An article as claimed in claim 1 wherein the polyarylene sulfide coating is an extruded coating which is heat-set.

5. An article as claimed in claim 1 wherein the substrate is elongated stock in the form of wires or optical fibers.

6. An article as claimed in claim 5 wherein the substrate is a wire of a metal comprising copper or aluminum.

* * * * *